United States Patent
Knoblauch et al.

(10) Patent No.: US 9,625,021 B2
(45) Date of Patent: Apr. 18, 2017

(54) ELECTRIC PORTAL AXLE FOR ELECTRICALLY DRIVING A MOTOR VEHICLE

(71) Applicant: Dr. Ing. h.c. F. Porsche Aktiengesellschaft, Stuttgart (DE)

(72) Inventors: Daniel Knoblauch, Ludwigsburg (DE); Falk Heilfort, Eberdingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 74 days.

(21) Appl. No.: 14/617,287

(22) Filed: Feb. 9, 2015

(65) Prior Publication Data
US 2015/0226297 A1 Aug. 13, 2015

(30) Foreign Application Priority Data
Feb. 12, 2014 (DE) .................. 10 2014 101 713

(51) Int. Cl.
*B60K 17/08* (2006.01)
*B60W 10/115* (2012.01)
(Continued)

(52) U.S. Cl.
CPC ........... *F16H 37/0833* (2013.01); *B60K 1/00* (2013.01); *B60K 7/0007* (2013.01);
(Continued)

(58) Field of Classification Search
CPC ... Y02T 10/7275; Y02T 10/645; Y02T 10/72; B60L 2240/423; B60L 2240/421;
(Continued)

(56) References Cited

U.S. PATENT DOCUMENTS 6,843,750 B1  1/2005  Bennett
6,978,853 B2  12/2005  Bennett
(Continued)

FOREIGN PATENT DOCUMENTS

DE         42 12 324      8/1992
DE    10 2009 036 299     2/2011
(Continued)

OTHER PUBLICATIONS

German Search Report of Oct. 22, 2014.

*Primary Examiner* — Ramya Burgess
*Assistant Examiner* — Lillian Nguyen
(74) *Attorney, Agent, or Firm* — Gerald E. Hespos; Michael J. Porco; Matthew T. Hespos

(57) ABSTRACT

An electric portal axle (1) for electrically driving a motor vehicle has a housing (28), a single electric machine (2) and two spur gear stages (13, 14) for driving two wheels of the axle. A shiftable transmission (5) is downstream of the electric machine (2) and is embodied as a planetary gear mechanism with a freewheel (6) and a differential (7). The portal axle (1) has a shifting mechanism (23) for shifting two gear stages of the portal axle (1). In a first gear stage, a ring gear (9) of the transmission (5) and a clutch body (27) that is fixed to the housing are connected, and a clutch (29) between the ring gear (9) and a planetary carrier (11) of the transmission (5) is opened. In a second gear stage the ring gear (9) and the clutch body (27) are disconnected and the clutch (29) is closed.

10 Claims, 4 Drawing Sheets

(51) Int. Cl.
 *B60K 7/00* (2006.01)
 *F16H 3/54* (2006.01)
 *F16H 48/10* (2012.01)
 *F16H 37/08* (2006.01)
 *B60K 17/04* (2006.01)
 *B60K 1/00* (2006.01)
 *B60L 15/20* (2006.01)

(52) U.S. Cl.
 CPC ............ *B60K 17/046* (2013.01); *B60K 17/08* (2013.01); *B60L 15/2054* (2013.01); *B60K 2001/001* (2013.01); *B60K 2007/0038* (2013.01); *B60K 2007/0061* (2013.01); *B60L 2240/421* (2013.01); *B60L 2240/423* (2013.01); *F16H 3/54* (2013.01); *F16H 48/10* (2013.01); *F16H 2200/0021* (2013.01); *F16H 2702/02* (2013.01); *Y02T 10/645* (2013.01); *Y02T 10/72* (2013.01); *Y02T 10/7275* (2013.01)

(58) Field of Classification Search
 CPC . F16H 3/54; F16H 48/22; F16H 48/10; F16H 37/0833; F16H 2200/0021; B60K 2001/001; B60K 2007/0061; B60K 2007/0038; B60K 7/0007; B60K 17/046; B60K 17/08; B60K 6/383; B60Y 2400/424; B60Y 2400/80; B60Y 2400/421; B60W 10/115
 See application file for complete search history.

(56) References Cited

U.S. PATENT DOCUMENTS

| | | | |
|---|---|---|---|
| 7,350,602 | B2 | 4/2008 | Colvin et al. |
| 9,527,382 | B2 | 12/2016 | Smetana |
| 2009/0211824 | A1* | 8/2009 | Knoblauch .............. B60K 1/00 180/65.7 |
| 2013/0130857 | A1* | 5/2013 | Gassmann ............... B60K 1/00 475/150 |
| 2013/0190124 | A1* | 7/2013 | Gassmann ............... B60K 1/00 475/150 |
| 2014/0256493 | A1* | 9/2014 | Knoblauch .......... B60K 7/0007 475/151 |

FOREIGN PATENT DOCUMENTS

| | | |
|---|---|---|
| DE | 10 2010 050 217 | 5/2012 |
| DE | 102012208926 | 12/2013 |

\* cited by examiner

ELECTRIC PORTAL AXLE FOR ELECTRICALLY DRIVING A MOTOR VEHICLE

CROSS REFERENCE TO RELATED APPLICATION

This application claims priority under 35 USC 119 to German Patent Appl. No. 10 2014 101 713.7 filed on Feb. 12, 2014, the entire disclosure of which is incorporated herein by reference.

BACKGROUND

1. Field of the Invention

The invention relates to an electric portal axle for electrically driving a motor vehicle having two spur gear stages for driving two wheels of the axle.

2. Description of the Related Art

DE 10 2009 036 299 A1 discloses an electric portal axle that has two electric machines. A wheel is mounted rotatably in the region of each of the two ends of the portal axle and each wheel can be driven by a rotor of the electric machine assigned thereto. A downstep gear mechanism that is embodied as a spur gear stage is arranged between the respective electric machine and wheel assigned thereto. The input shaft of the respective spur gear stage is arranged closer to the ground on which the vehicle is standing than the output shaft of the spur gear stage. The region between the spur gear stages accordingly is positioned lower. As a result, the electric machines are positioned lower with respect to the underlying surface under the motor vehicle, thereby lowering the center of gravity of the motor vehicle.

An electric portal axle also can be configured so that the region between the spur gear stages is not lower, but instead is raised. As a result, the motor vehicle can be used off road.

Electrically drivable vehicles that have portal frames also are known from U.S. Pat. No. 6,843,750 B1, U.S. Pat. No. 6,978,853 B2 and U.S. Pat. No. 7,350,602 B2.

The object of the present invention is to provide an electric portal axle that can be shifted in two stages, for electrically driving a motor vehicle.

SUMMARY OF THE INVENTION

The portal axle of the invention has a single electric machine, and in addition a shiftable transmission with a freewheel and a differential. The transmission with the freewheel and differential are arranged downstream of the single electric machine. In addition, the portal axle has a housing and two spur gear stages for driving the two wheels of the axle. The shiftable transmission is a planetary gear mechanism, and has a shifting means for for shifting the two gear stages of the portal axle. A first gear stage has a ring gear of the planetary gear mechanism and is connected to a clutch body that is fixed to the housing. A clutch between the ring gear and a planetary carrier of the planetary gear mechanism is opened. In a second gear stage, the ring gear and the clutch body that is fixed to the housing are disconnected and the clutch is closed.

The clutch may be active in a frictionally locking fashion. The clutch therefore can be implemented with a very compact design or method of construction. The clutch preferably is a multi-disk clutch.

The power of the electric machine may be transmitted via the freewheel during the shifting process. The freewheel is passed after the clutch is closed and the power of the electric machine then is transmitted via the clutch. Accordingly, the electric portal axle permits a power-shift 2-gear speed transmission.

The portal axle may be configured so that in the first gear stage the ring gear is fixed to the housing in the traction direction via the freewheel and in the thrust direction via the clutch body. In the second gear stage, the ring gear preferably is disconnected from the clutch body and the clutch is closed and the freewheel is released.

The output occurs to the differential via the planetary carrier in the planetary gear mechanism to achieve optimum force flow.

The shifting means may be a shifting sleeve that may also function as the outer multi-disk carrier of the multi-disk clutch.

The electric portal axle may be configured so that the single electric machine, the planetary gear mechanism, the freewheel, the differential and the two spur gear stages are arranged in a common housing. Thus, the electric portal axle forms a structural unit.

The wheels of the axle can be driven via universal shafts by means of the electric portal axle.

The invention therefore may provide an electric portal axle and a power-shift 2-gear speed transmission with a planetary spur-gear design to achieve purely electric drive with a portal design. Shifting occurs by just one actuator—the shifting means. The electric machine can recuperate in both gear speeds. Compared to 1-gear speed variants, the structural expenditure is only slightly higher. Overall, the portal axle of the invention has a very compact design or method of construction. This 2-gear speed concept provides optimized performance and efficiency compared to 1-gear speed concepts.

Further features of the invention are found in the appended drawings and the description of the exemplary embodiments in the drawing, without being restricted thereto.

DETAILED DESCRIPTION

Figure 1:
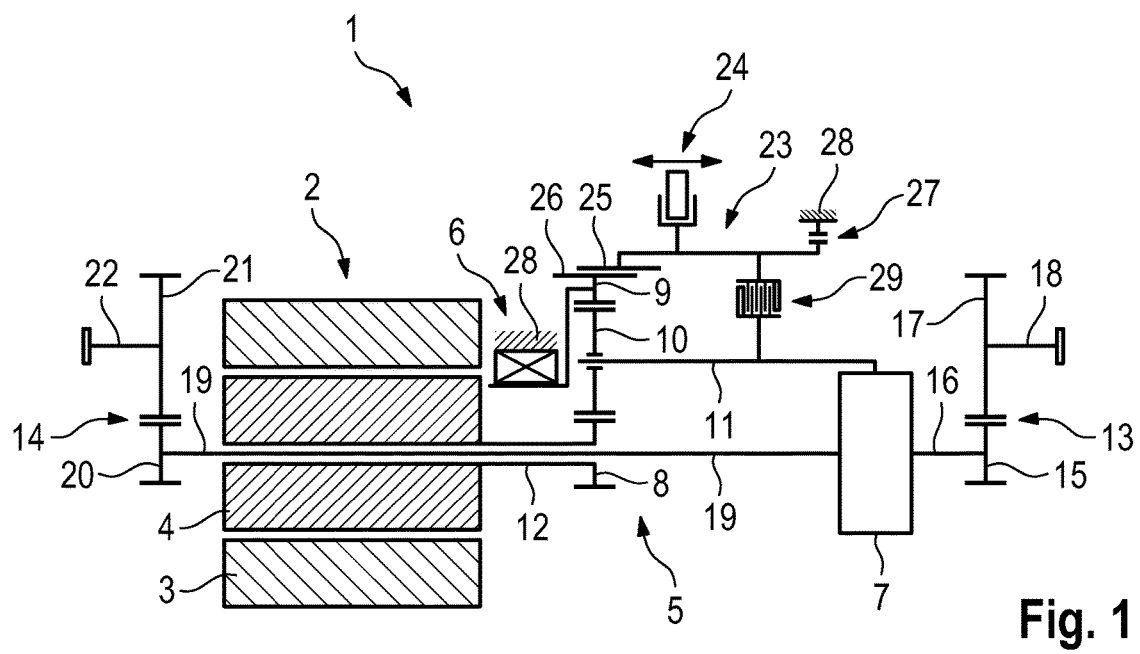
FIG. 1 is a basic outline of the electric portal axle for electrically driving a motor vehicle.

FIG. 1 shows the basic design of the electric portal axle 1 for electrically driving a motor vehicle. The portal axle 1 has a single electric machine 2 that is installed in the transverse direction of the vehicle. The electric machine 2 has a stator 3 and a rotor 4 is denoted by the reference number 3, and a rotor 4. A shiftable planetary gear mechanism 5 is arranged downstream of the electric machine 2 and has a freewheel 6 and a differential 7. The planetary gear mechanism 5 has an internal sun gear 8, an external ring gear 9 and planetary gears 10 that mesh with the sun gear 8 and the ring gear 9. The planetary gears 10 are mounted in a planetary carrier 11. The sun gear 8 is connected in a rotationally fixed fashion to a rotor-side output shaft 12 of the electric machine 2. The ring gear 9 interacts with the freewheel 6.

The planetary carrier 11 interacts with the differential 7. The right and left sides of the output are connected via this differential 7. In this context, a spur gear stage 13 and 14 is provided on each output side. The spur gear stage 13 that is arranged on the right output side is connected to a differential-side output shaft 16 in the region of a gearwheel 15 with a relatively small diameter. A gearwheel 17 of the spur gear stage 13 meshes with the gearwheel 15. The gearwheel 17 is connected in a rotationally fixed fashion to an output shaft 18 and has a larger diameter than the gearwheel 15. A universal shaft is connected in a rotationally fixed fashion to the output shaft 18 and drives a wheel on the right side of the vehicle.

The side of the differential 7 facing away from the output shaft 16 for the spur gear stage 13 has an output shaft 19 for the left spur gear stage 14. This differential-side output shaft 19 penetrates the output shaft 12 that is connected to the rotor 4 of the electric machine 2. The left spur gear stage 14 is configured like the right spur gear stage 13 and therefore has a smaller gearwheel 20, a relatively large gearwheel 21 that meshes therewith and an output shaft 22. The output shaft 22 interacts with a universal shaft that drives the wheel of this axle on the left side.

The spur gear stages are embodied as downstep transmissions and permit the electric machine to be lower with respect to the underlying surface under the motor vehicle and therefore allow the center of gravity of the motor vehicle to be lower.

The electric portal axle 1 has a shifting sleeve 23 for shifting two gear stages of the portal axle 1. A shifting actuator system 24 functions to shift the shifting sleeve 23 in the axial direction of the output shaft 12 of the electric machine 2. The end of the shifting sleeve 23 facing the ring gear 9 has a shifting projection 25 that interacts with a guide sleeve 26 arranged on the radially outer circumference of the ring gear 9. Thus, the shifting sleeve 23 and therefore the shifting projection 25 are connected in the axial direction of the ring gear 9 so as to be displaceable in relation to the ring gear 9. However, the shifting sleeve 23 is connected in a rotationally fixed fashion to the ring gear 9. The end of the shifting sleeve 23 facing away from the ring gear 9 can be connected to a clutch body 27 that is connected permanently to a housing 28 of the portal axle 1. In addition, a clutch 29, which is embodied as a multi-disk clutch, is arranged between the planetary carrier 11 and the shifting sleeve 23 that is connected to the ring gear 9 in a torque-transmitting fashion.

Figure 2:
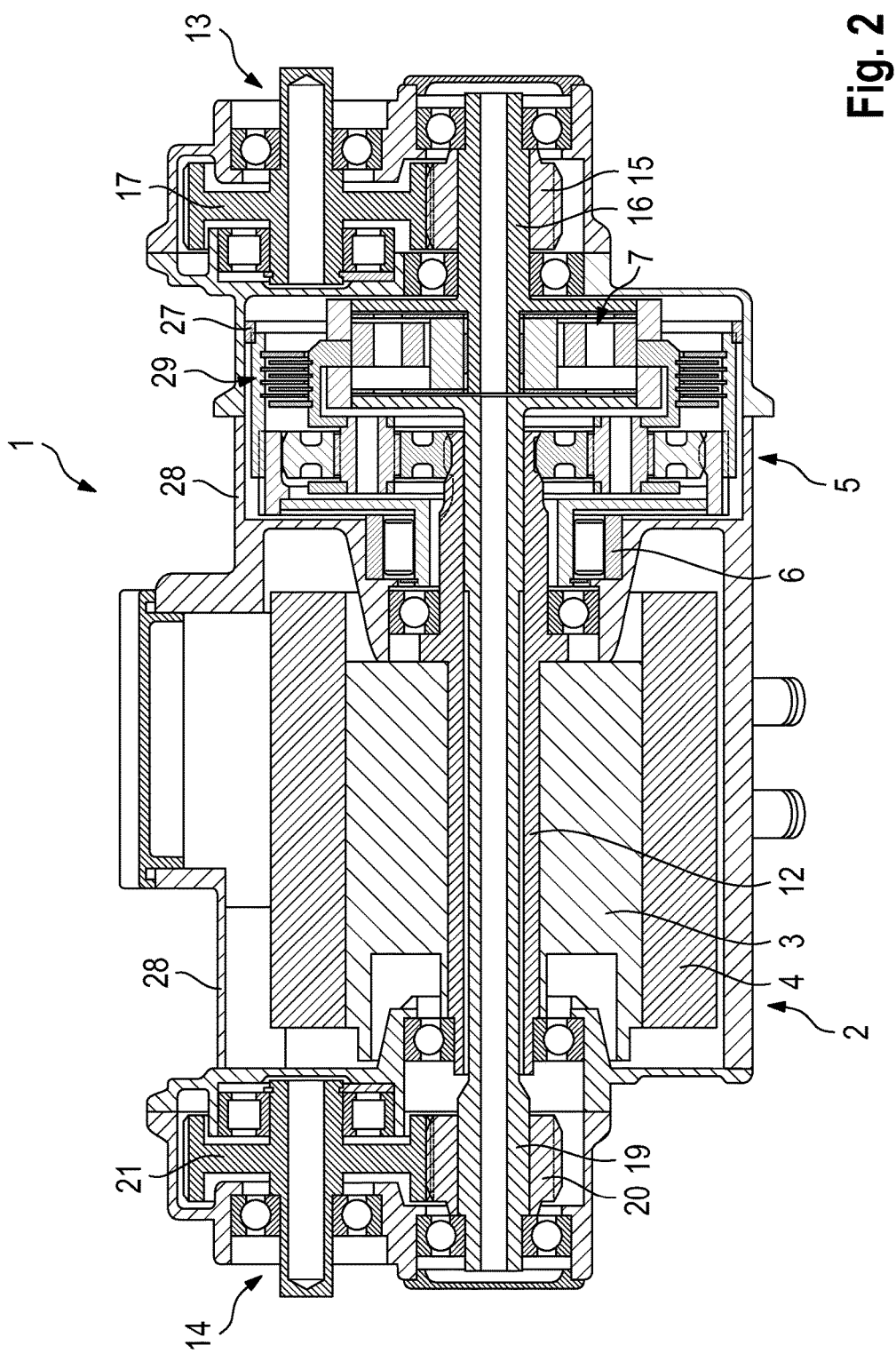
FIG. 2 shows the electric portal axle that operates according to the principle in accordance with FIG. 1.

FIG. 2 illustrates a specific embodiment of the components of the electric portal axle 1 that are illustrated in the basic outline in FIG. 1. In this regard, the components in FIG. 2 that correspond to those according to FIG. 1 are denoted by the same reference symbols. In particular, the illustration includes the ring gear 9 with the guide sleeve 26 and non-return mechanism that forms the freewheel 6, and the shifting sleeve 23 including the external disks 30 of the clutch 29. Furthermore, the planetary carrier 11 including the internal disks 31 of the clutch 29 and the input of the differential 7 are shown. Finally, FIG. 2 illustrates the clutch body 27 that is fixed to the housing, including the back lash control.

Figure 3:
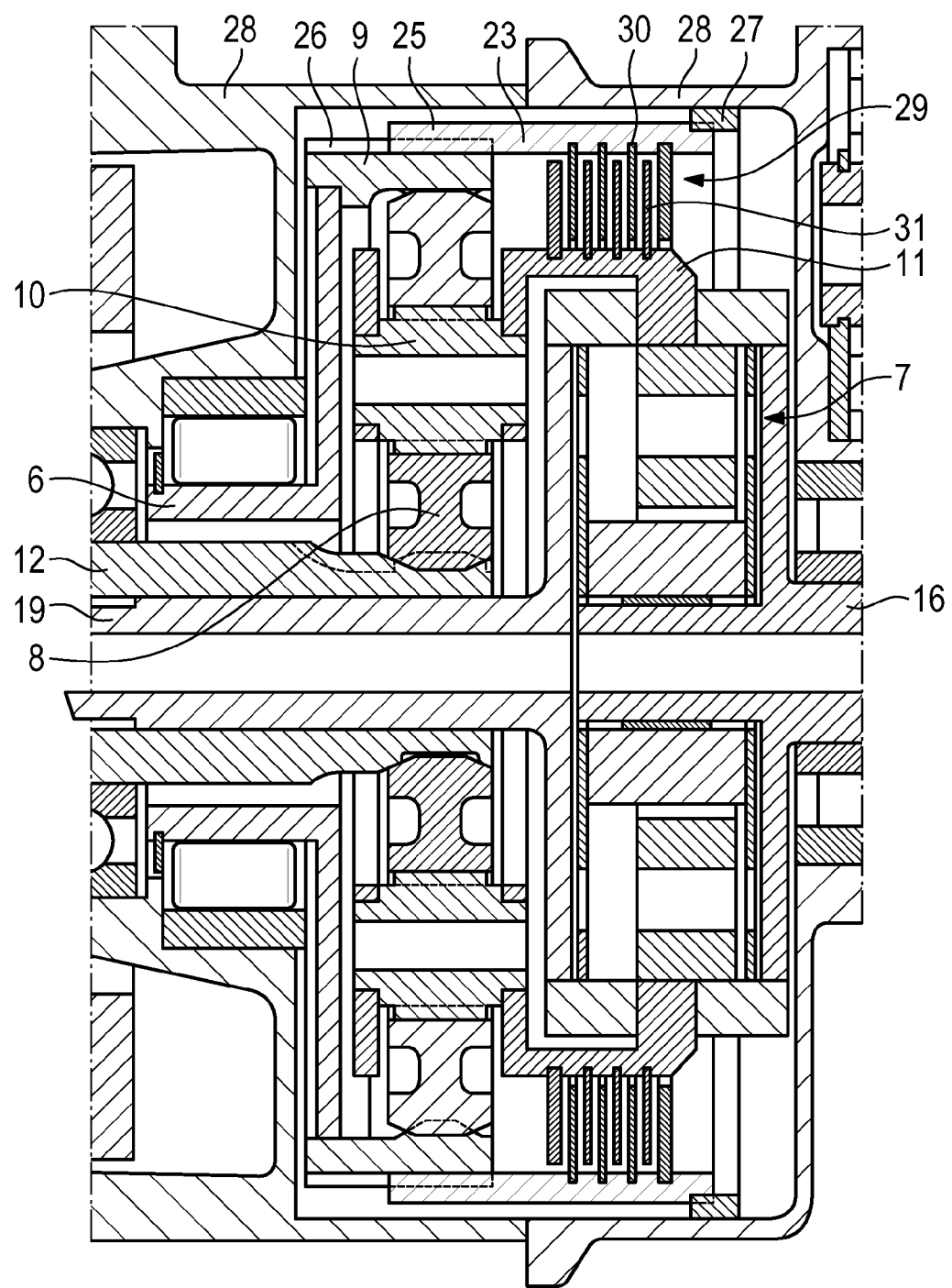
FIG. 3 is an enlarged illustration of the shifting region of the electric portal axle according to FIG. 2.

FIG. 3 is an enlarged illustration of the actual shifting region of the electric portal axle 1 according to FIG. 2.

Figure 4:
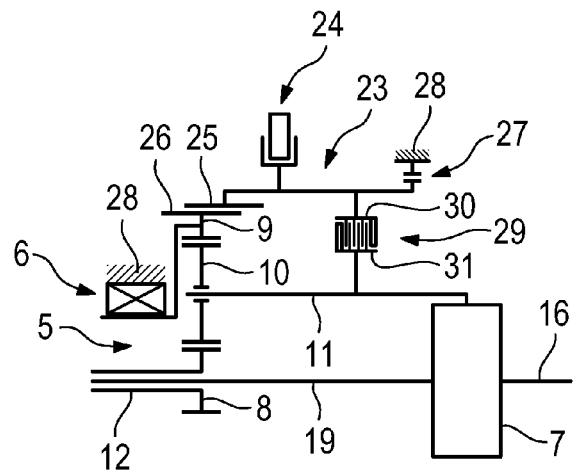
FIG. 4 is a basic outline of the region of the electric portal axle comprising the shifting means of the electric portal axle, illustrating the shifted first gear stage.
Figure 5:
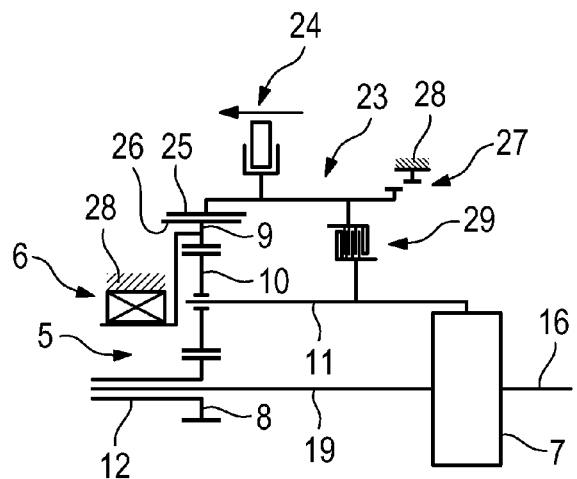
FIG. 5 is the basic outline according to FIG. 4, illustrating the shifting process from the first gear stage to the second gear stage.
Figure 6:
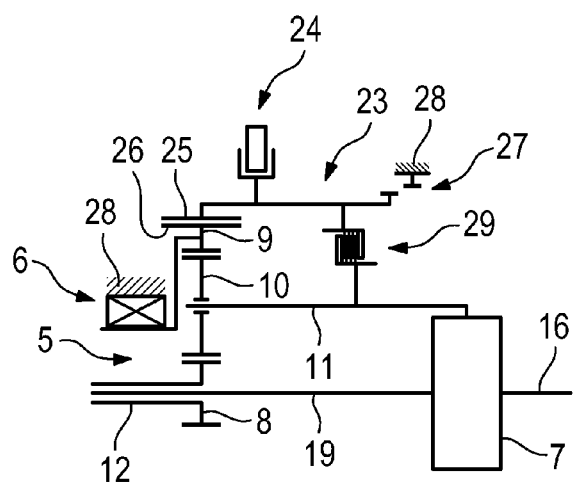
FIG. 6 shows the basic outline according to FIGS. 4 and 5, illustrating the shifted second gear stage.

FIGS. 4 to 6 show the different shifting states of the portal axle that can be shifted in two gear stages.

FIG. 4 illustrates the shifting state in the case of the first gear stage. In the first gear, the ring gear 9 of the planetary gear mechanism 5 and the clutch body 27 that is fixed to the housing are connected permanently, wherein the clutch 29 is open. The transmission ratio is formed by the planetary gear mechanism 5. The ring gear 9 is fixed to the housing via the freewheel 6 in the traction direction, and via the clutch body 27 in the thrust direction. As a result, recuperation is possible in the thrust direction. The output occurs via the planetary carrier 11 to the differential 7 and from there via the output shaft 16 to the spur gear stage 13, and via the output shaft 19 to the spur gear stage 14. The wheels of the axle are driven via the spur gear stages 13, 14.

FIG. 5 illustrates the shifting process during the shifting from the first gear stage into the second gear stage. In this context, the connection of the ring gear 9 and the clutch body 27 is disconnected by means of the shifting actuator system 24. The drive torque is transmitted via the freewheel 6. The clutch 29 is closed, and the bite point of the clutch 29 is approached in a frictionally locking fashion when the external and internal disks of said clutch approach one another. The clutch 29 is closed in a frictionally locking fashion and in the process the freewheel 6 is passed. This occurs with adaptation of the rotational speed of the electric machine 2. The power flow via the clutch 29 occurs in a frictionally locking fashion.

FIG. 6 illustrates the state when the second gear stage is engaged. In this context, the ring gear 9 is disconnected from the clutch body 27, and the clutch 29 is connected in a frictionally locking fashion between the ring gear 9 and the planetary carrier 11. The freewheel 6 is released since an internal ring of the freewheel passes over an external ring of the freewheel. Recuperation is possible in this second gear stage. The output occurs via the planetary carrier 11 to the differential 7.

An electric portal axle 1 for electrically driving a motor vehicle therefore is provided in which the power of the electric machine 2 is transmitted via the freewheel 6 during the shifting process, and after the closing of the clutch 29 the freewheel 6 is passed and the power of the electric machine 2 is transmitted via the clutch 29. In the first gear stage, the ring gear 9 is fixed to the housing via the freewheel 6 in the traction direction and via the clutch body 27 in the thrust direction. In the second gear stage, the ring gear 9 is disconnected from the clutch body 27, and the clutch 29 is closed, and the freewheel 6 is released. The shifting actuator 24 functions to axially shift the shifting means 23 and the shifting sleeve 23. The shifting means 23 can be fixed with respect to rotation by the clutch body 27, and the shifting means 23 is fixed with respect to rotation in the ring gear 9 and is displaceable axially with respect to the ring gear 9.

The electric machine 2, the planetary gear mechanism 5, the freewheel 6, the differential 7 and the two spur gear stages 13, 14 are arranged within the common housing 28.

What is claimed is:

1. An electric portal axle for electrically driving a motor vehicle, the portal axle having two spur gear stages for driving two wheels of the axle, the portal axle comprising: a single electric machine, a shiftable transmission with a freewheel and a differential arranged downstream of the single electric machine, and a housing, the shiftable transmission being a planetary gear mechanism, and the portal axle having a shifting means for shifting two gear stages of the portal axle, a ring gear of the transmission being connected to a clutch body in a first gear stage, with the clutch body being fixed to the housing, and a clutch between the ring gear and a planetary carrier of the transmission is opened, and, in a second gear stage, the ring gear and the clutch body that is fixed to the housing are disconnected and the clutch is closed.

2. The portal axle of claim 1, wherein the clutch is active in a frictionally locking fashion.

3. The portal axle of claim 1, wherein during shifting the power of the electric machine is transmitted via the freewheel, and after closing the clutch the freewheel is passed and the power of the electric machine is transmitted via the clutch.

4. The portal axle of claim 1, wherein in the first gear stage the ring gear is fixed to the housing in the traction direction via the freewheel and in the thrust direction via the clutch body.

5. The portal axle of claim 1, wherein in the second gear stage, the ring gear is disconnected from the clutch body, the clutch is closed and the freewheel is released.

6. The portal axle of claim 1, wherein an output occurs to the differential via the planetary carrier.

7. The portal axle of claim 1, wherein the shifting means is a shifting sleeve.

8. The portal axle of claim 1, wherein the electric machine, the transmission, the freewheel, the differential and the two spur gear stages are arranged inside the housing.

9. The portal axle of claim 1, wherein the wheels of the axle are driven by articulated shafts.

10. The portal axle of claim 1, further comprising a shifting actuator for axially shifting the shifting means, wherein the shifting means can be fixed with respect to rotation by the clutch body, and the shifting means is fixed with respect to rotation in the ring gear and is displaceable axially with respect to the ring gear.

* * * * *